(12) United States Patent
Kim et al.

(10) Patent No.: US 9,581,844 B2
(45) Date of Patent: Feb. 28, 2017

(54) METHOD FOR FABRICATION OF CURVED-SURFACE DISPLAY PANEL

(75) Inventors: Yang-Rae Kim, Incheon (KR);
Hwan-Jin Kim, Gyeonggi-do (KR);
Jin-Woo Lee, Incheon (KR)

(73) Assignee: TOVIS CO., LTD., Incheon (KR)

( * ) Notice: Subject to any disclaimer, the term of this patent is extended or adjusted under 35 U.S.C. 154(b) by 422 days.

(21) Appl. No.: 13/822,671

(22) PCT Filed: Aug. 25, 2011

(86) PCT No.: PCT/KR2011/006275
§ 371 (c)(1),
(2), (4) Date: Mar. 13, 2013

(87) PCT Pub. No.: WO2012/036389
PCT Pub. Date: Mar. 22, 2012

(65) Prior Publication Data
US 2013/0180653 A1 Jul. 18, 2013

(30) Foreign Application Priority Data

Sep. 16, 2010 (KR) .................. 10-2010-0090942

(51) Int. Cl.
*B29C 35/08* (2006.01)
*G02F 1/1333* (2006.01)
(Continued)

(52) U.S. Cl.
CPC ......... *G02F 1/1333* (2013.01); *B32B 38/1866* (2013.01); *G02F 1/133305* (2013.01);
(Continued)

(58) Field of Classification Search
CPC .............. G02F 1/1333; G02F 1/133305; G02F 2202/28; G02F 2001/133354; B32B 37/1292; B32B 2307/412; B32B 37/1284; B32B 2457/202; B32B 38/10; B32B 37/02; B32B 2309/105; B32B 38/1866
(Continued)

(56) References Cited

U.S. PATENT DOCUMENTS 7,791,279 B2 9/2010 Kwon et al.
7,910,033 B2 3/2011 Kamata et al.
(Continued)

FOREIGN PATENT DOCUMENTS

JP 2004-069627 A 3/2004
JP 2007-041534 A 2/2007
(Continued)

OTHER PUBLICATIONS

JP2010-097028 English machine translation (Apr. 2010).*

*Primary Examiner* — Michael N Orlando
*Assistant Examiner* — Elizabeth Bradford
(74) *Attorney, Agent, or Firm* — Rabin & Berdo, P.C.

(57) ABSTRACT

A curved-surface display panel fabrication method for fabricating a curved display panel having a desired curved shape using a flat display panel having a first substrate and a second substrate, includes: paring partially outer surfaces of the first substrate and the second substrate so as to reduce thicknesses thereof to a predetermined thickness; and attaching a reinforcing plate having the same shape with the desired curved shape and light transmitting characteristics to the display panel using an adhesive layer which is formed on at least a portion of edge portions of the display panel in a state that the pared flat display panel is bent to the desired curved shape.

12 Claims, 8 Drawing Sheets

(51) Int. Cl.
   *B32B 38/18* (2006.01)
   *B32B 37/02* (2006.01)
   *B32B 37/12* (2006.01)
   *B32B 38/10* (2006.01)

(52) U.S. Cl.
   CPC ........... *B32B 37/02* (2013.01); *B32B 37/1284* (2013.01); *B32B 37/1292* (2013.01); *B32B 38/10* (2013.01); *B32B 2307/412* (2013.01); *B32B 2309/105* (2013.01); *B32B 2457/202* (2013.01); *G02F 2001/133354* (2013.01); *G02F 2202/28* (2013.01); *Y10T 156/1064* (2015.01)

(58) Field of Classification Search
   USPC ....... 156/272.2, 273.3, 275.5, 293, 297, 298
   See application file for complete search history.

(56) References Cited

U.S. PATENT DOCUMENTS

| | | | |
|---|---|---|---|
| 7,920,223 B2 | 4/2011 | Nishizawa et al. | |
| 7,927,533 B2 | 4/2011 | Kamiya et al. | |
| 8,087,967 B2 | 1/2012 | Shinya et al. | |
| 2006/0098153 A1* | 5/2006 | Slikkerveer ....... | G02F 1/133305 349/187 |
| 2006/0273304 A1* | 12/2006 | Cok ................................. | 257/40 |
| 2007/0228952 A1 | 10/2007 | Kwon et al. | |
| 2008/0006819 A1* | 1/2008 | McCormick et al. ......... | 257/40 |
| 2009/0015747 A1 | 1/2009 | Nishizawa et al. | |
| 2009/0059126 A1 | 3/2009 | Koganezawa | |
| 2009/0161048 A1 | 6/2009 | Satake et al. | |
| 2009/0186552 A1 | 7/2009 | Shinya et al. | |
| 2009/0284904 A1 | 11/2009 | Wu et al. | |
| 2009/0296033 A1 | 12/2009 | Shinya et al. | |
| 2010/0003425 A1 | 1/2010 | Kamata et al. | |
| 2010/0033648 A1* | 2/2010 | Kaganezawa ..... | G02F 1/133305 349/58 |
| 2010/0033661 A1 | 2/2010 | Shinya et al. | |
| 2010/0043965 A1 | 2/2010 | Kamiya et al. | |
| 2010/0097552 A1 | 4/2010 | Shinya et al. | |
| 2010/0097746 A1 | 4/2010 | Toyoda et al. | |
| 2010/0098839 A1 | 4/2010 | Toyoda et al. | |
| 2010/0118245 A1 | 5/2010 | Toyoda et al. | |
| 2010/0134713 A1 | 6/2010 | Toyoda et al. | |
| 2010/0178834 A1 | 7/2010 | Toyoda et al. | |
| 2010/0210166 A1 | 8/2010 | Toyoda et al. | |
| 2011/0019129 A1 | 1/2011 | Nishizawa et al. | |

FOREIGN PATENT DOCUMENTS

| | | |
|---|---|---|
| JP | 2008-268768 A | 11/2008 |
| JP | 2009-020168 A | 1/2009 |
| JP | 2009-115933 A | 5/2009 |
| JP | 2009-205065 A | 9/2009 |
| JP | 2010-097028 A | 4/2010 |
| JP | 2010-156784 A | 7/2010 |
| KR | 10-0435826 B1 | 6/2004 |
| KR | 10-0435826 B1 | 8/2004 |
| KR | 10-2005-0085066 A | 8/2005 |
| KR | 10-2007-0093545 A | 9/2007 |
| KR | 10-2010-0049020 A | 5/2010 |

\* cited by examiner

FIG. 4
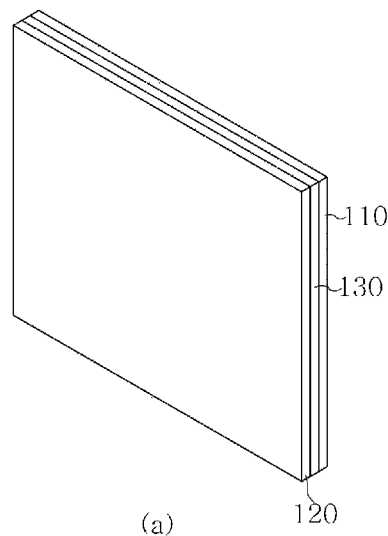
(a)
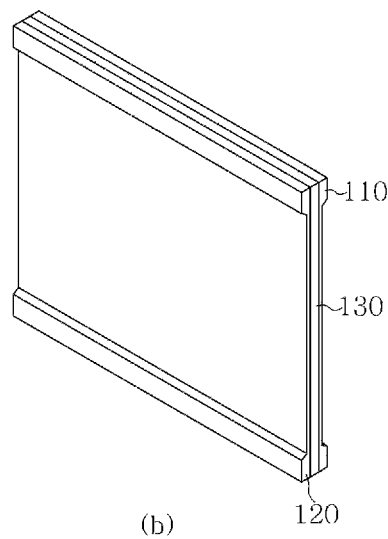
(b)

METHOD FOR FABRICATION OF CURVED-SURFACE DISPLAY PANEL

FIELD OF THE INVENTION

The present invention relates to a curved-surface display panel fabrication method for fabricating a display panel having a curved surface using a flat display panel.

BACKGROUND ART

Various display devices have been developed and are being used. A liquid crystal display device which realizes images using liquid crystal is widely used.

Generally, a liquid crystal display (LCD) includes two display panels and a liquid crystal layer disposed therebetween and having a dielectric anisotropy. An electric filed is formed in the liquid crystal layer, and a transmittance of light passing the liquid crystal layer is regulated by regulating amplitude of the electric field so as to obtain a desired image. Such a liquid crystal display is representative one of a flat panel display (FPD), and TFT-LCD which uses thin film transistor (TFT) as a switching element is widely used.

A plurality of display signal lines i.e., gate lines and data lines, a plurality of thin film transistors and pixel electrodes are formed on a lower display panel of the two display panels of the liquid crystal display panel, and a color filter and a common electrode are formed on a upper display panel.

Such a liquid crystal display panel is generally manufactured in a flat shape, so the conventional liquid crystal display panel cannot be used as a curved display.

In order to solve this problem, a flexible liquid crystal display panel which has flexible substrates instead of glass substrates of a conventional liquid crystal display panel so as to be bent by external bending force has been developed.

However, there is a problem that the manufacturing process of the conventional flexible liquid crystal display panel is difficult and the manufacturing cost thereof is high.

DETAILED DESCRIPTION OF THE INVENTION

Technical Problem

The present invention has been made in an effort to provide a curved-surface display panel fabrication method which can produces a display panel having a curved shape through a simple process using a conventional flat display panel.

Technical Solution

An exemplary curved-surface display panel fabrication method according to an embodiment of the present invention for fabricating a curved display panel having a desired curved shape using a flat display panel having a first substrate and a second substrate, includes: paring partially outer surfaces of the first substrate and the second substrate so as to reduce thicknesses thereof to a predetermined thickness; and attaching a reinforcing plate having the same shape with the desired curved shape and light transmitting characteristics to the display panel using an adhesive layer which is formed on at least a portion of edge portions of the display panel in a state that the pared flat display panel is bent to the desired curved shape.

The adhesive layer may be formed along edges of the display panel in a shape of a closed figure.

The adhesive layer may be formed of OCA (optically clear adhesive).

The reinforcing plate may be attached to the display panel by the adhesive layer in a state of being spaced from the pared outer surfaces of the first substrate and the second substrate.

A reinforcing layer having light transmitting characteristics may be formed in a space between the reinforcing plate and the first substrate and the second substrate.

The curved-surface display panel fabrication method may further include attaching a polarizer on one or more of the pared outer surfaces of the first substrate and the second substrate.

In the paring the edge portions to be bent with the curved shape among the outer surface of the first substrate and the second substrate may be pared to ends thereof, and the method may further include forming a reinforcing strip along the bent edge portion in a state that the display panel is bent to the curved shape before the attaching the reinforcing plate to the display panel.

The reinforcing strip may be formed by curing an UV (ultraviolet) ray curing resin.

Advantageous Effects

According to the present invention, outer surfaces of the first substrate and the second substrate of a conventional flat display panel are partially removed to reduce the thicknesses thereof and then a reinforcing plate is attached in a state that the display panel is bended to maintain the curved shape, so the curved display panel can be fabricated through simple process.

BRIEF DESCRIPTION OF DRAWINGS

FIG. 4 is a drawing for explaining a process of partially removing outer surfaces a flat display panel in a curved-surface display panel fabrication method according to an embodiment of the present invention.

DETAILED DESCRIPTION OF THE EMBODIMENTS

Figure 1:
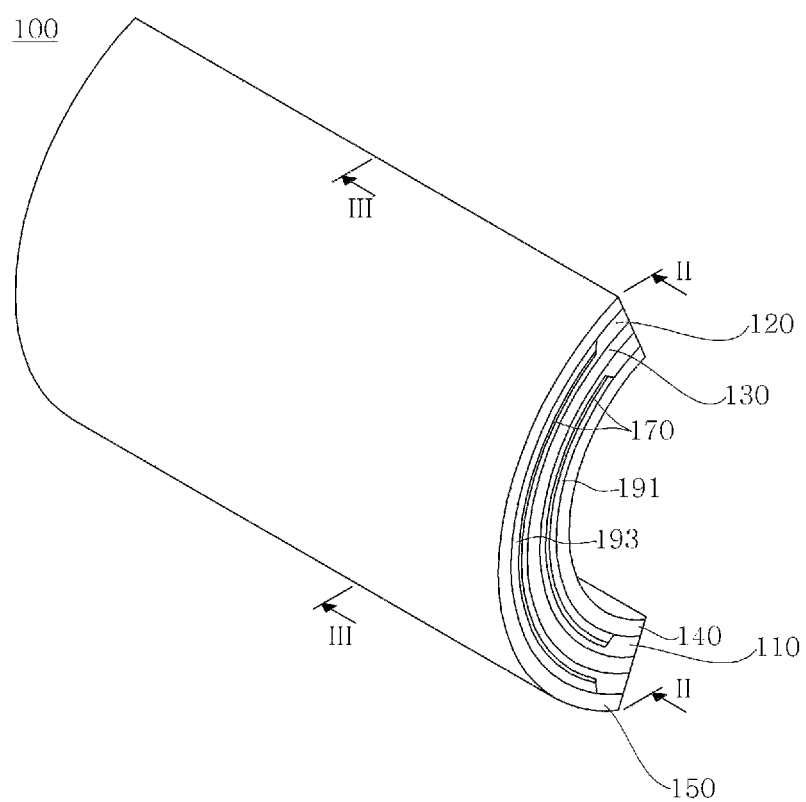
FIG. 1 is a schematic perspective view of a curved display panel formed by a curved-surface display panel fabrication method according to an embodiment of the present invention.

Embodiments of the present invention will now be described hereinafter with reference to the accompanying drawings.

A curved-surface display panel fabrication method according to the present invention relates to a method which forms a display panel having a desired curved shape using a conventional flat display panel having two substrates facing one another. For example, the display panel having a desired curved shape can be fabricated from a liquid crystal display panel which includes two substrates facing one another and a liquid crystal layer formed therebetween. A method for fabricating a curved-surface display using a liquid crystal display panel will be explained.

As shown in FIG. 1 to FIG. 7, a method for fabricating a curved-surface display panel according to an embodiment of the present invention forms a display panel having a desired curved shape using a flat display panel 100a (referring to FIG. 4) having a first substrate 110 and a second substrate 120 facing each other and a liquid crystal layer 130 having liquid crystals aligned in a vertical or parallel direction with respect to the two substrates 110 and 120.

The first substrate 100 may be referred to as a thin film transistor array substrate, and the second substrate 120 may be referred to as a color filter array substrate.

Meanwhile, not shown in the drawing, at edges of the two substrates 110 and 120, a sealant which is made of material for bonding the two substrates 110 and 120 and forms a space which is filled with liquid crystal may be disposed, and the liquid crystal is prevented from being leaked by the sealant.

A method for forming a curved-surface display panel according to an embodiment of the present invention will be explained hereinafter in detail with reference to FIG. 4 to FIG. 7.

A method for fabricating a curved-surface display panel according to an embodiment of the present invention includes paring partially outer portions of the first substrate 110 and the second substrate 120 respectively so as to reduce thicknesses thereof to predetermined thicknesses. That is, as shown in (a) of FIG. 4, by removing outer surfaces of the first substrate 100 and the second substrate 120 of the conventional flat type liquid crystal display panel 100a, a shape of (b) of FIG. 4 is obtained.

At this time, in the step of paring outer portions ((a) to (b) in FIG. 4), a method of paring the first substrate 110 and the second substrate 120 may be any one of methods known in the art. For example, it may be a mechanical polishing method or an etching method using etchant.

When the outer portion of the first substrate 110 and the second substrate 120 are pared, edge portions which are not bent in the desired curved shape may not be removed. That is, as shown in (b) of FIG. 4, the upper and lower portions of the first substrate 110 and the second substrate 120 may be not pared. This may protect the driving circuits such as PCB (Printed Circuit Board) to which a driver for driving the liquid crystal panel and various circuit elements are connected may be connected to the upper and lower edges of the substrates. In addition, not paring the upper and lower edges of the substrates, the upper and lower edge portions may play a role of a guide for members which will be attached in the subsequent processes, and may play a role of enhancing the structural strength of the curved-surface display panel.

Figure 2:
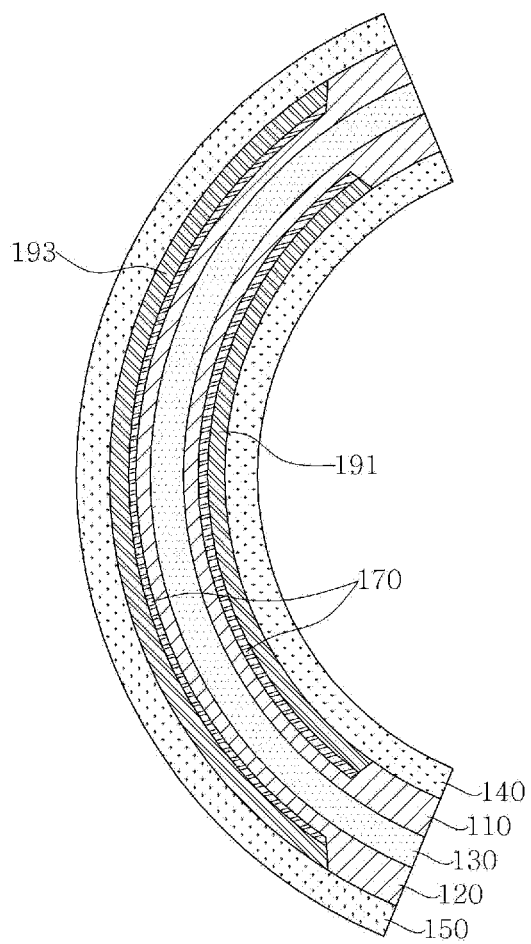
FIG. 2 is a cross sectional view taken along a line II-II in FIG. 1.
Figure 3:
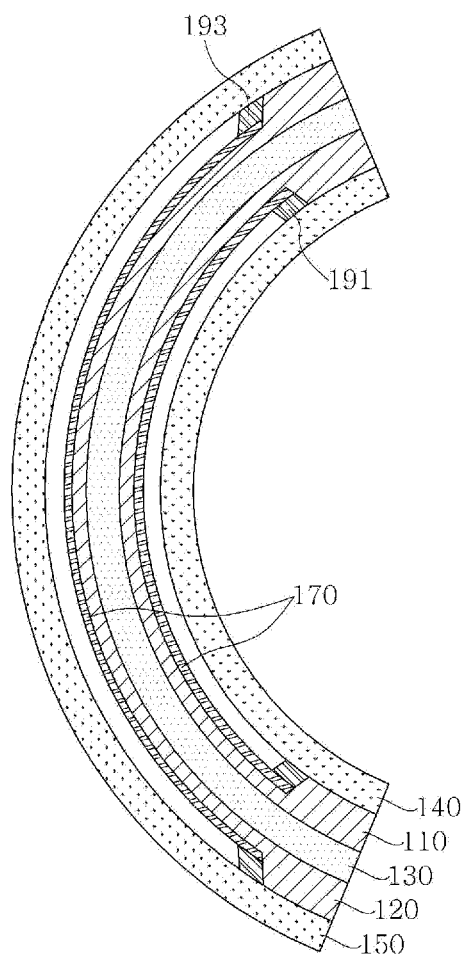
FIG. 3 is a cross sectional view taken along a line III-III in FIG. 1.

The desired curved shape may be a round bracket or a curve shape without an inflection point as shown in FIG. 1 to FIG. 3, and may be an S-shaped curve or a curve shape having one or more inflection points. That is, the desired curved shape may be variously altered.

Further, in the paring step (from (a) to (b) of FIG. 4), the predetermined thickness may be within a range of 50 to 150 μm. If the thicknesses of the first substrate 110 and the second substrate 120 after being pared is less than 50 μm or greater than 200 μm, they may be broken during being bent or may be difficult to be bent. That is, since the thickness of the first substrate 110 and the second substrate 120 after being pared is between 50 to 150 μm, the first substrate 110 and the second substrate 120 can be bent without being broken.

Meanwhile, a method for fabricating a curved-surface display panel according to an embodiment of the present invention may further include the step of attaching one or more polarizers 170 on at least one of the pared outer surfaces of the first substrate 110 and the second substrate 120. At this time, the polarizer 170 may be attached in a state that the first substrate 110 and the second substrate 120 are bent to have the desired curved shape.

Figure 5:
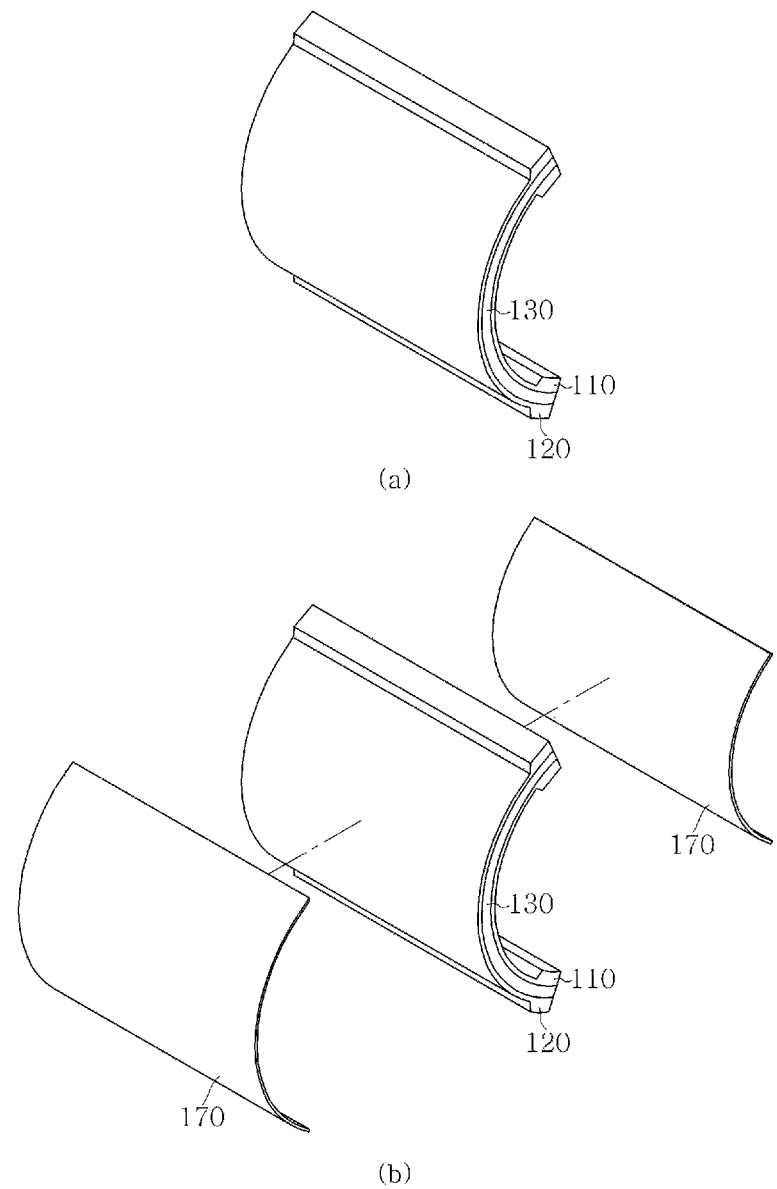
FIG. 5 is a drawing for explaining a process of attaching polarizers at outer surfaces of a display panel in a curved-surface display panel fabrication method according to an embodiment of the present invention.

As shown in FIG. 2, FIG. 3 and FIG. 5, the polarizer 170 can be attached to the pared outer surfaces of the first substrate 110 and the second substrate 120 respectively, but can be attached to only one of the outer surfaces of the first substrate 110 and the second substrate 120.

Meanwhile, according to another embodiment of the present invention, the polarizer 170 may also be attached to the outer surface of reinforcing plates 140 and 150, which will be described later, instead of the outer surfaces of the first substrate 110 and the second substrate 120.

In addition, a method for fabricating a curved-surface display panel according to an embodiment of the present invention includes attaching reinforcing plates 140 and 150 with light transparent characteristics having the same shape with the desired curved surface to the display panel 100a using adhesive layers 191 and 193 which are formed at least on a portion of the edge areas of the display panel 100a. At this time, although the adhesive layers 191 and 193 and the reinforcing plates 140 and 150 are provided respectively on both outer surfaces of the first substrate 110 and the second substrate 120, the adhesive layers 191 and 193 and the reinforcing plates 140 and 150 may be provided on only one of the outer surfaces of the first substrate 110 and the second substrate 120. For example, the adhesive layer and the reinforcing plate may be provided only on a front surface of the second substrate 120 which is closer to a person who sees a display screen among the first substrate 110 and the second substrate 120.

Figure 6:
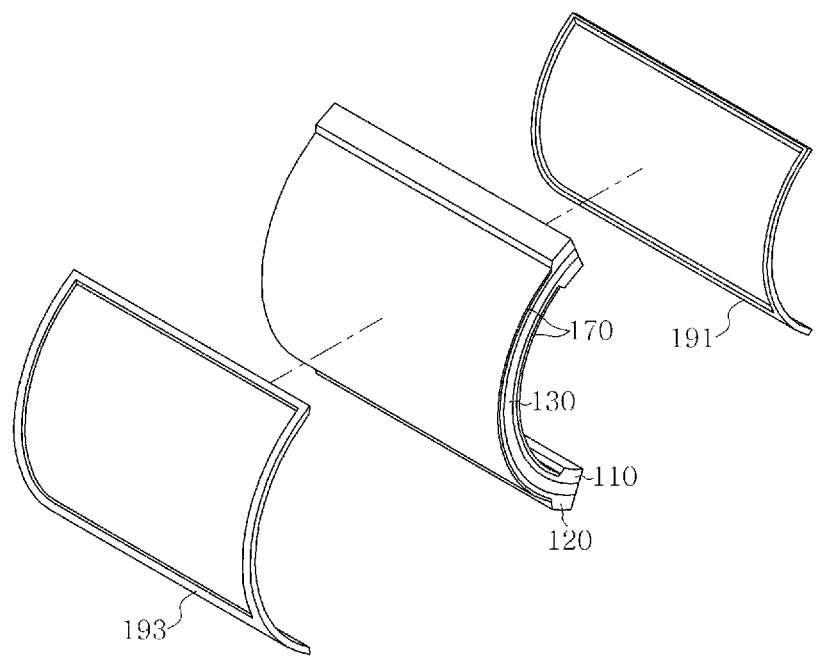
FIG. 6 is a drawing for explaining a process of forming adhesive layers on outer surfaces of a display panel in a curved-surface display panel fabrication method according to an embodiment of the present invention.

For example, referring to FIG. 6, the adhesive layers 191 and 193 may be formed in a closed figure (e.g., a rectangular loop shape in the drawing) along edges of the pared outer surfaces of the first substrate 110 and the second substrate 120. In more detail, as shown in FIG. 6, the adhesive layers 191 and 193 may be formed in a closed figure having a predetermined width and having a dam shape along edges of the pared portions among the outer surfaces of the first substrate 110 and the second substrate 120. At this time, referring to FIG. 1 and FIG. 3, the adhesive layers 191 and 193 may be formed to be of the same height with the non-pared portion of the outer surfaces of the first substrate 110 and the second substrate 120 or to be slightly higher than the non-pared portion of the outer surfaces of the first substrate 110 and the second substrate 120, so the reinforcing plates 140 and 150 can contact the adhesive layers 191 and 193 to be adhered thereto.

For example, the adhesive layers 191 and 193 may be formed with OCA (optically clear adhesive).

Figure 7:
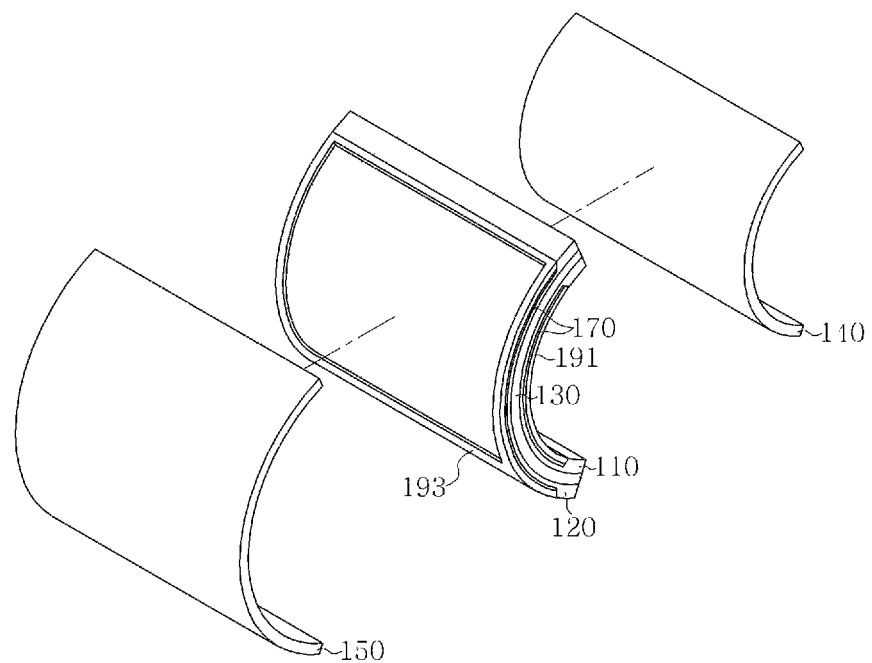
FIG. 7 is a drawing for explaining a process of attaching reinforcing plates on outer surfaces of a display panel in a curved-surface display panel fabrication method according to an embodiment of the present invention.

Further, referring to FIG. 7, the reinforcing plates 140 and 150 can be adhered to the adhesive layers 191 and 193 which are formed along edges of the outer surfaces of the first substrate 110 and the second substrate in a state that the display panel 100a is bent in a desired curved surface, so as to be attached to the display panel.

The reinforcing plates 140 and 150 may be formed of material having a good light transmitting characteristics, for example materials such as glass or PMMA (PolyMethly MethAcrylate). At this time, the reinforcing plates 140 and 150 may have the same curved shape with the desired curved shape of the curved-surface display panel, and may have strength to maintain the curved shape. As such, after paring outer surfaces of the conventional flat liquid crystal display panel to be flexible and bending the same in a desired curve shape, by attaching the reinforcing plates 140 and 150 having the same curve shape onto the outer surfaces of the bent liquid crystal panel 100a, the curved-surface display panel having the desired curved shape can be formed.

At this time, the reinforcing plates 140 and 150 may be attached to the display panel 100a by the adhesive layers 191 and 193 in a state of being spaced from the pared outer surfaces of the first substrate 110 and the second substrate 120. That is, referring to FIG. 3, empty spaces are formed between the reinforcing plates 140 and 150 and the pared outer surfaces of the first substrate 110 and the second substrate 120 so as to form an air gap therebetween. With the existence of the air gap therebetween, the weight of the curved-surface display panel can be reduced and further a shock absorbing effect to protect the first substrate 110 and the second substrate 120 from external shock can be obtained.

Meanwhile, not shown in the drawing, an anti-reflective coating may be formed on an outer surface of the reinforcing plate 150 to improve the display characteristics.

Figure 8:
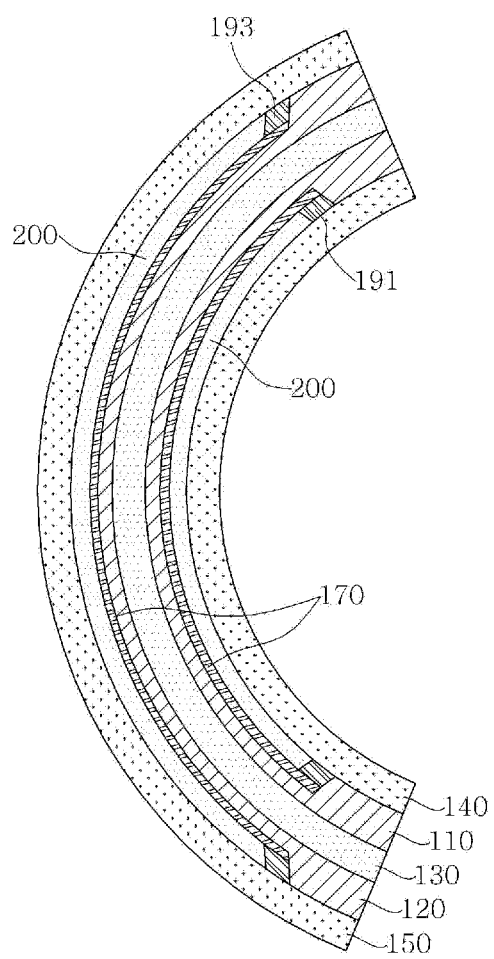
FIG. 8 is a sectional view of a curved-surface display panel which is formed by a curved-surface display panel fabrication method according to another embodiment of the present invention.

FIG. 8 is a sectional view of a curved-surface display panel which is formed by a curved-surface display panel fabrication method according to another embodiment of the present invention.

Although in the above-described embodiment an empty space is formed between the reinforcing plates 140 and 150 and the first and second substrates 110 and 120, a reinforcing layer 200 with light transmitting characteristics is formed in a space between the reinforcing plates 140 and 150 and the first and second substrates 110 and 120.

For example, the reinforcing layer 200 with light transmitting characteristics may be formed by filling OCA (optically clear adhesive) within the space between the reinforcing plates 140 and 150 and the first and second substrates 110 and 120.

The reinforcing plates 140 and 150 and the first and second substrates 110 and 120 can be firmly attached to one another by the reinforcing layer 200 which is formed therebetween, and the overall strength of the curved-surface display panel can be enhanced.

Hereinafter, referring to FIG. 9, a method for fabricating a curved-surface display panel according to another embodiment of the present invention will be explained.

Different from the above-described embodiment, in this embodiment, in a state that the first and second substrates 110 and 120 are pared and are then bent, before forming the adhesive layers 191 and 193 and attaching the reinforcing plates 140 and 150 using the same, reinforcing strips 310 and 320 are formed along the curved edges of the first and second substrates 110 and 120. At this time, the edge portions of the outer surfaces of the first and second substrates 110 and 120 which will be bent are fully pared to the outer ends thereof.

Figure 9:
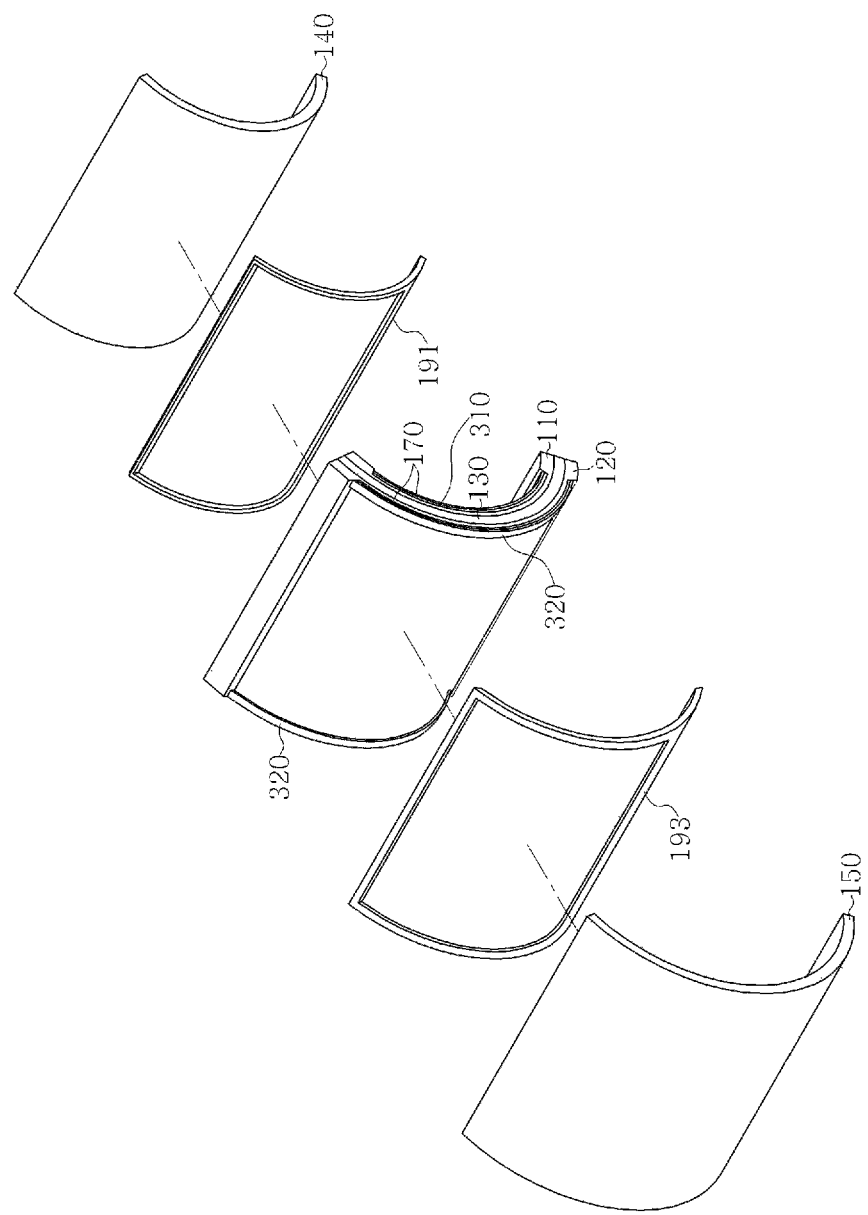
FIG. 9 is a drawing for explaining a curved-surface display panel fabrication method according to another embodiment of the present invention.

That is, referring to FIG. 9, the edge portions (i.e., left and right edge portions in the drawing) of the first and second substrates 110 and 120 which are bent are fully pared to the outer ends thereof, and the reinforcing strips 310 and 320 having a predetermined width and height are formed in a state that the first and second substrates 110 and 120 are bent. For example, the width of the reinforcing strips 310 and 320 can be determined suitably with consideration of the display area, and the thickness of the reinforcing strips 310 and 320 can be set such that the height of the upper surface thereof is equal to the outer surfaces of the first and second substrates 110 and 120 before being pared or slightly lower than the same. Moreover, the reinforcing strips 310 and 320 extend continuously for an entire dimension of the pared left and right edge portions of the first and second substrates 110 and 120. The entire dimension extends from one of the non-pared edge portions of the first substrate 110 to another of the non-pared edge portions of the first substrate 110, or from one of the non-pared edge portions of the second substrate 120 to another of the non-pared edge portions of the second substrate 120, and the dimension may be a length of the pared left and right edge portions.

At this time, the reinforcing strips 310 and 320 may be formed by curing UV (ultraviolet) ray curing resin.

Meanwhile, although it is shown in FIG. 9 that the reinforcing strips 310 and 320 are formed on the polarizers 170 in a state that the polarizers 170 are attached to the first and second substrates 110 and 120, in case that the polarizers 170 are omitted, the reinforcing strips 310 and 320 may be attached directly on the first and second substrates 110 and 120. In addition, although it is shown that the reinforcing strips 310 and 320 are formed on both outer surfaces of the first and second substrates 110 and 120, the reinforcing strip may be formed on only one of the outer surfaces of the first and second substrates 110 and 120.

As such, by forming the reinforcing strips 310 and 320, the structural strength of the edge portion which is pared to the outer end thereof and is bent can be substantially increased.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

The present invention relates to a display fabrication method and can be applied to a fabrication method of various display devices such as a curved-surface LCD, so that present invention has an industrial applicability.

The invention claimed is:
1. A curved-surface display panel fabrication method for fabricating a curved display panel having a desired curved shape using a flat display panel having a first substrate and a second substrate comprising:
   partially paring portions of outer surfaces of the first substrate and the second substrate, which are to be bent to form the desired curved shape, so as to reduce thicknesses thereof to predetermined thicknesses and thereby form a pared display panel, in the paring first edge portions of the outer surfaces of the first substrate and the second substrate, which are not to be bent to form the desired curved shape, are not pared, and second edge portions of the outer surfaces of the first substrate and the second substrate, which are to be bent to form the desired curved shape formed by the portions of the outer surfaces, are pared to ends thereof;

bending the outer surfaces of the pared display panel to the desired curved shape by bending the second edge portions to the desired curved shape but not the first edge portions;

after the paring, forming a reinforcing strip along the second edge portions in a state that the pared display is bent to the desired curved shape, the reinforcing strip extending continuously along an entire length of the second edge portions; and after the forming a reinforcing strip, attaching a reinforcing plate, having the same shape with the desired curved shape and light transmitting characteristics, to the pared display panel using an adhesive layer which is formed on at least a portion of the second edge portions in a state that the pared display panel is bent to the desired curved shape, the reinforcing plate being attached to the pared display panel by the adhesive layer to directly contact the first edge portions, which are not pared, in a state where the reinforcing plate is spaced from at least one of the second edge portions of the outer surfaces of the first and second substrates.

2. The curved-surface display panel fabrication method of claim 1, wherein the adhesive layer is formed along the second edge portions to form a shape of a closed figure.

3. The curved-surface display panel fabrication method of claim 2, wherein the adhesive layer is formed of OCA (optically clear adhesive).

4. The curved-surface display panel fabrication method of claim 1, the adhesive layer is formed of OCA (optically clear adhesive).

5. The curved-surface display panel fabrication method of claim 1, further comprising attaching a reinforcing layer, that has light transmitting characteristics, in a space between the reinforcing plate and one selected from the group consisting of the first substrate and the second substrate.

6. The curved-surface display panel fabrication method of claim 1, further comprising attaching a polarizer on one or more of the pared outer surfaces of the first substrate and the second substrate.

7. The curved-surface display panel fabrication method of claim 1, wherein the reinforcing strip is formed by curing an ultraviolet (UV) ray curing resin.

8. The curved-surface display panel fabrication method of claim 1, wherein a longitudinal axis of the reinforcing strip extends parallel to a direction along which the entire length of the second edge portions extends.

9. The curved-surface display panel fabrication method of claim 1, wherein an upper surface of the reinforcing strip is flush with the first edge portions.

10. A method for fabricating a curved display panel, having a desired curved shape, from a flat display panel having first and second substrates, the method comprising:

paring the first substrate and the second substrate, which are to be bent to form the desired curved shape, so that first edge portions of outer surfaces of the first substrate and the second substrate, which are not to be bent to form the desired curved shape, are not pared, and second edge portions of the outer surfaces of the first substrate and the second substrate, which are to be bent to form the desired curved shape, are pared to ends thereof;

bending the pared second edge portions to the desired curved shape but not the first edge portions;

forming a reinforcing strip along the second edge portions while the second edge portions are bent to the desired curved shape, the reinforcing strip extending continuously along an entire length of the second edge portions; and after the forming a reinforcing strip, attaching a reinforcing plate, having the same shape with the desired curved shape and light transmitting characteristics, to the first and second substrates using an adhesive layer which is formed on at least a portion of the second edge portions and while the second edge portions are bent to the desired curved shape, the reinforcing strip directly contacting the first edge portions so that the reinforcing plate is spaced from at least one of the second edge portions of the outer surfaces of the first and second substrates.

11. The method of claim 10, wherein a longitudinal axis of the reinforcing strip extends parallel to a direction along which the entire length of the second edge portions extends.

12. The method of claim 10, wherein an upper surface of the reinforcing strip is flush with the first edge portions.

* * * * *